(12) United States Patent
Bansal et al.

(10) Patent No.: US 8,204,675 B2
(45) Date of Patent: Jun. 19, 2012

(54) PORTABLE NAVIGATION DEVICE POINT OF INTEREST SELECTION BASED ON STORE OPEN PROBABILITY

(75) Inventors: Ravi Prakash Bansal, Tampa, FL (US); Mauro Marzorati, Lutz, FL (US); Brian Marshall O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/409,883

(22) Filed: Mar. 24, 2009

(65) Prior Publication Data

US 2010/0250118 A1    Sep. 30, 2010

(51) Int. Cl.
G01C 21/26    (2006.01)
(52) U.S. Cl. ............................ 701/204; 340/825.72
(58) Field of Classification Search .............. 701/204; 705/2, 3, 7.25; 340/825.72
See application file for complete search history.

(56) References Cited

U.S. PATENT DOCUMENTS

| | | | |
|---|---|---|---|
| 4,086,434 A * | 4/1978 | Bocchi | 379/91.01 |
| 7,130,742 B2 | 10/2006 | Kobuya et al. | |
| 7,130,807 B1 * | 10/2006 | Mikurak | 705/7.25 |
| 2004/0201500 A1 | 10/2004 | Miller et al. | |
| 2005/0015307 A1 * | 1/2005 | Simpson et al. | 705/26 |
| 2005/0046584 A1 * | 3/2005 | Breed | 340/825.72 |
| 2005/0165543 A1 * | 7/2005 | Yokota | 701/204 |
| 2006/0229808 A1 | 10/2006 | Manabe | |
| 2008/0027639 A1 | 1/2008 | Tryon | |
| 2008/0033633 A1 * | 2/2008 | Akiyoshi et al. | 701/201 |
| 2008/0046298 A1 | 2/2008 | Ben-Yehuda et al. | |
| 2008/0214204 A1 * | 9/2008 | Ramer et al. | 455/456.1 |

FOREIGN PATENT DOCUMENTS

| | | |
|---|---|---|
| EP | 1309062 | 5/2003 |
| WO | WO2009109766 | * 3/2009 |

OTHER PUBLICATIONS

Mikhail A. Lisovich and Stephen B. Wicker, Privacy Concerns in Upcoming Residential and Commerical Demand-Response Sytems, IEE Proceedings on Power Systems, vol. 1, No. 1, Mar. 2008.*

* cited by examiner

*Primary Examiner* — Lena Najarian
*Assistant Examiner* — Teresa Woods
(74) *Attorney, Agent, or Firm* — Yee & Associates, P.C.; Mark C. Vallone (57) ABSTRACT

A probability that a selected point of interest is accessible to customers for commercial transactions is determined. In response to receiving a mailing address of a selected candidate point of interest and a calculated estimated time of arrival, it is determined whether the mailing address of the selected candidate point of interest is stored in a data storage device. In response to determining that the mailing address of the selected candidate point of interest is stored in the data storage device, a percentage probability that the selected candidate point of interest is accessible to customers for commercial transactions at the calculated estimated time of arrival is assigned based on utility usage data and a confidence level associated with the utility usage data stored in the data storage device. The percentage probability that the selected candidate point of interest is accessible to customers for commercial transactions is sent via the network.

15 Claims, 6 Drawing Sheets

FIG. 1

POINTS OF INTEREST TABLE
400

| POI NAME | LOCATION | UNIQUE ID | CURRENT USAGE | TEMPERATURE | CONFIDENCE LEVEL |
|---|---|---|---|---|---|
| RESTAURANT A | 35° 23.2' N 78° 67.57' W | 78384223347 | 2000 KwH | 55 | MEDIUM |
| RESTAURANT B | 35° 17.3' N 78° 68.58' W | 52352534235 | 100 KwH | 56 | HIGH |
| RESTAURANT C | 35° 22.2' N 78° 23.50' W | 42786657235 | 2500 KwH | 55 | HIGH |
| RESTAURANT D | 35° 19.2' N 78° 56.51' W | 56358822434 | 2323 KwH | 54 | LOW |
| RESTAURANT E | 35° 22.7' N 78° 88.55' W | 45288564485 | 2100 KwH | 53 | HIGH |

| UNIQUE ID | DATE/TIME | USAGE | TEMPERATURE |
|---|---|---|---|
| 78384223347 | 7/18/2008 5:00 PM | 2000 KwH | 80 |
| 78384223347 | 7/18/2008 8:00 PM | 2100 KwH | 75 |
| 78384223347 | 7/18/2008 9:00 PM | 2050 KwH | 72 |
| 78384223347 | 7/18/2008 10:00 PM | 2000 KwH | 70 |
| 78384223347 | 7/18/2008 11:00 PM | 800 KwH | 70 |
| 78384223347 | 7/19/2008 12:00 AM | 800 KwH | 65 |
| 78384223347 | 7/19/2008 2:00 AM | 825 KwH | 65 |
| 78384223347 | 7/19/2008 4:00 AM | 400 KwH | 65 |
| 78384223347 | 7/19/2008 8:00 AM | 2000 KwH | 72 |

PORTABLE NAVIGATION DEVICE POINT OF INTEREST SELECTION BASED ON STORE OPEN PROBABILITY

BACKGROUND OF THE INVENTION

1. Field of the Invention

The present invention relates generally to an improved data processing system and more specifically to a computer implemented method, apparatus, and computer usable program code for determining a probability that a selected point of interest is open for business at a given time of day in response to a query from a portable navigation device.

2. Description of the Related Art

The Global Positioning System (GPS) is the only fully functional Global Navigation Satellite System (GNSS). Utilizing a constellation of at least 24 Medium Earth Orbit satellites, which transmit precise microwave signals, the global positioning system enables a GPS receiver to determine its location, speed, direction, and time. A GPS receiver is the user's component of the global positioning system. In general, GPS receivers are composed of an antenna, tuned to the frequencies transmitted by the satellites, receiver-processors, and a highly stable clock. GPS receivers also include a display for providing location and speed information to the user. GPS receivers designed for automobile travel enable users to route from a current location to a destination location.

Typically, GPS receivers designed for automobile travel are pre-loaded with software that uses a points of interest (POI) database. These POI are usually categorized by type, such as restaurants, movie theaters, amusement parks, gas stations, and the like. Typical information included in a POI record is similar to what may be found in a telephone book, such as name, address, and phone number. Some GPS receivers also include the ability to receive traffic information via FM radio broadcast from one or more separate service providers. In addition, some GPS receivers include mobile telephone circuitry, which enable these types of receivers to transmit information as well. In other words, many technologies and services may be combined in GPS receivers to aid travelers in reaching their destination in an efficient manner.

Currently, POI databases built into GPS receivers do not account for variability of interest over time. In other words, a point of interest is more interesting when it is open for business than when it is closed. It may be irritating to a user to arrive at a location indicated by the GPS receiver as a POI at a time when the location is not interesting (i.e., closed). This may be especially irritating when a user is navigating in unfamiliar territory, which is often the case when a user is relying on a GPS navigation unit. Furthermore, such an arrival results in wasted time and fuel.

BRIEF SUMMARY OF THE INVENTION

According to one embodiment of the present invention, a probability that a selected point of interest is accessible to customers for commercial transactions at an estimated time of arrival is determined. In response to receiving a mailing address of a selected candidate point of interest and a calculated estimated time of arrival at the selected candidate point of interest from a portable navigation device via a network, it is determined whether the mailing address of the selected candidate point of interest is stored in a data storage device. In response to determining that the mailing address of the selected candidate point of interest is stored in the data storage device, a percentage probability that the selected candidate point of interest is accessible to customers for commercial transactions at the calculated estimated time of arrival is assigned based on utility usage data and a confidence level value associated with the utility usage data stored in the data storage device. The confidence level value weights the utility usage data. The percentage probability that the selected candidate point of interest is accessible to customers for commercial transactions at the calculated estimated time of arrival is sent to the portable navigation device via the network.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable data storage medium(s) may be utilized. The computer-usable or computer-readable data storage medium may be, for example but not limited to, an electronic, magnetic, optical, or semiconductor system, apparatus, or device. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable data storage medium may be any medium that can store the program for use by or in connection with the instruction execution system, apparatus, or device.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
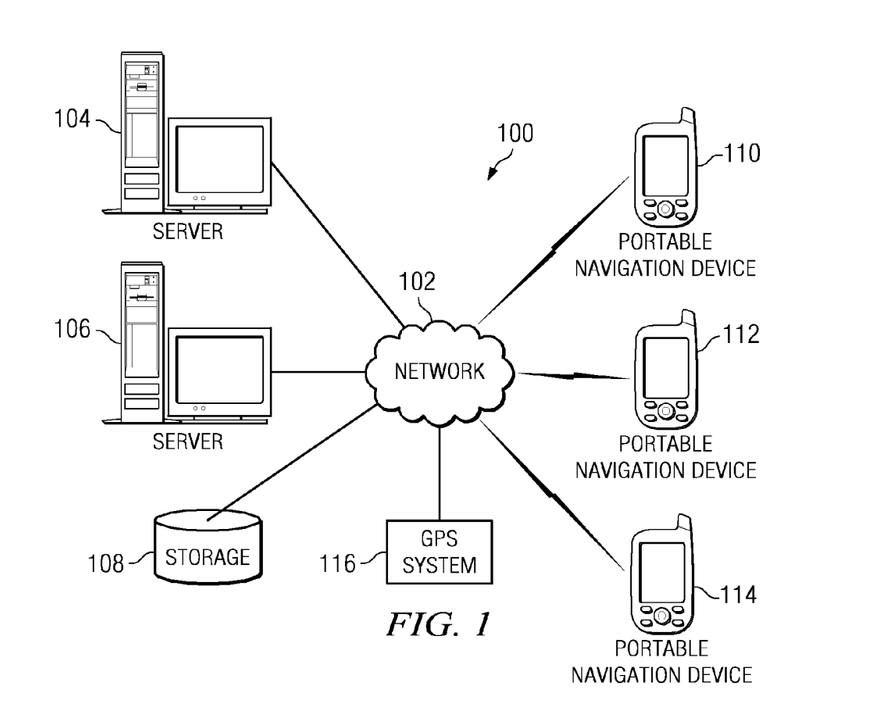
FIG. 1 is a pictorial representation of a network of data processing systems in which illustrative embodiments may be implemented.
Figure 2:
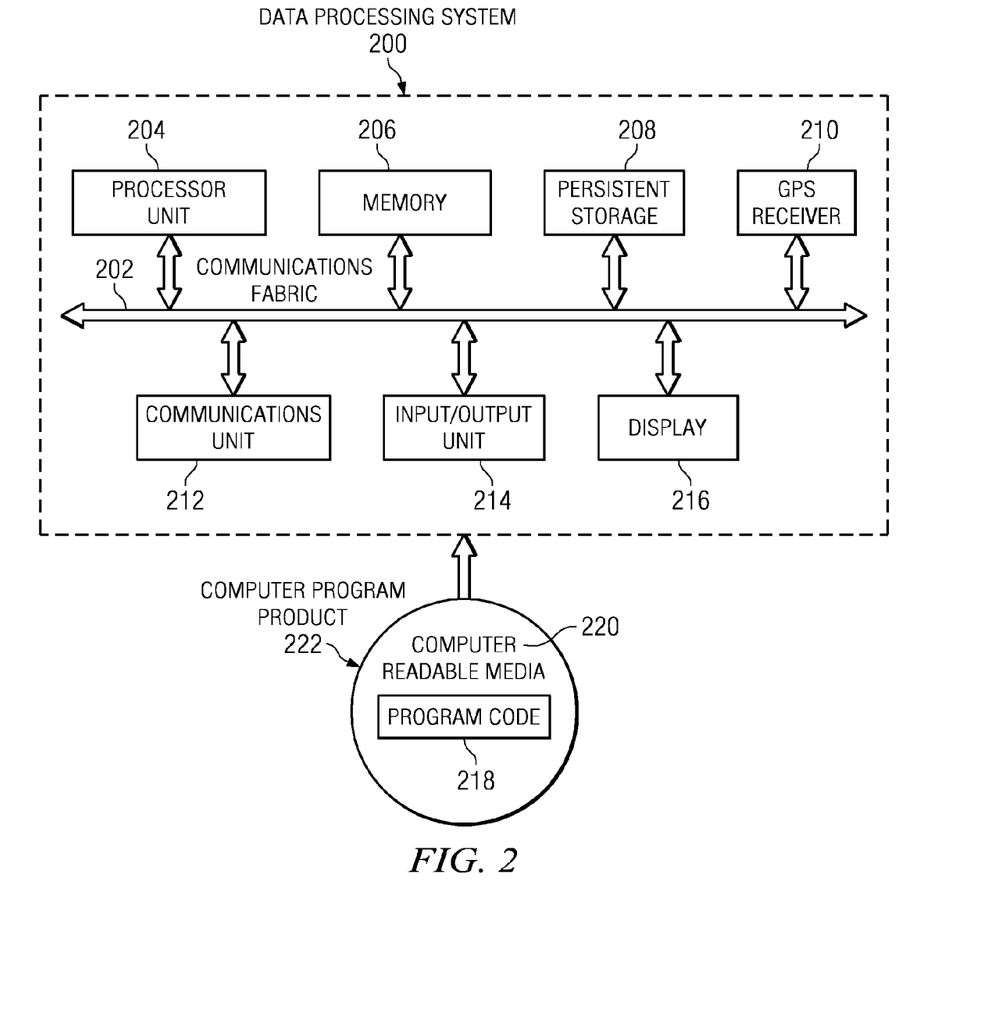
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which illustrative embodiments may be implemented. Network data processing system 100 may, for example, be a navigation system for determining a probability that a point of interest is accessible to customers for commercial transactions at an estimated time of arrival. Network data processing system 100 contains network 102, which is the medium used to provide communications links between the various data processing systems and devices connected together within network data processing system 100. Network 102 may include connections, such as wire, wireless communication links, or fiber optic cables.

In the depicted example, server 104 and server 106 connect to network 102, along with storage unit 108. Server 104 and server 106 represent one or more service providers that provide point of interest data to a plurality of wireless mobile devices. In addition, server 104 and server 106 may reside in one or more networks of computers and other devices that are necessary for providing these point of interest informational services.

Storage 108 represents any type of storage device that is capable of storing data in a structured or relational format. However, it should be noted that storage 108 may alternatively store data in an unstructured format as well. Also, storage 108 may represent a plurality of storage units coupled to network 102. Storage 108 may, for example, be data warehouse or a database that stores point of interest and other related data for the service providers.

Further, portable navigation devices 110, 112, and 114 also connect to network 102. Portable navigation devices 110, 112, and 114 may represent, for example, global positioning system (GPS) units, personal digital assistants (PDAs), cellular telephones, or any other mobile device capable of receiving point of interest data via a wireless network. Portable navigation devices 110, 112, and 114 are clients to server 104 and server 106 in this example. Server 104 and server 106 provide point of interest content to portable navigation devices 110, 112, and 114. Furthermore, server 104 and server 106 may provide other data, such as boot files, operating system images, and applications to portable navigation devices 110, 112, and 114.

Moreover, network data processing system 100 also includes GPS system 116. GPS system 116 provides portable navigation devices 110, 112, and 114 with the data necessary to calculate their respective location, speed, direction, and time. Also, network data processing system 100 may include additional server devices, client devices, and other devices not shown.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a client device, such as portable navigation device 110 in FIG. 1, in which computer usable program code or instructions implementing the processes of the illustrative embodiments may be located. In this illustrative example, data processing system 200 includes communications fabric 202, which provides communications between processor unit 204, memory 206, persistent storage 208, GPS receiver 210, communications unit 212, input/output (I/O) unit 214, and display unit 216.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip.

As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard disk drive, a flash memory, a rewritable optical disk, a rewritable magnetic tape, or some combination of the above. The media used by persistent storage 208 also may be removable. For example, a removable hard disk drive may be used for persistent storage 208. In addition, persistent storage 208 may represent a plurality of persistent storage units.

GPS receiver 210 is an example of a device that receives GPS data from a GPS system, such as GPS system 116 in FIG. 1, in order to determine its location, speed, direction, and time. However, it should be noted that GPS receiver 210 may also represent a GPS transceiver capable of both receiving and transmitting data. In addition, GPS receiver 210 is capable of receiving other types of data, such as, for example, points of interest data and associated information.

Communications unit 212, in these examples, provides for communications with other data processing systems or devices, such as, for example, server 104 and server 106 in FIG. 1. In these examples, communications unit 212 is a network interface card. Communications unit 212 may provide communications through the use of either, or both, physical and wireless communications links.

Input/output unit 214 allows for input and output of data with other devices that may be connected to data processing system 200. For example, input/output unit 214 may provide a connection for user input through an alphanumeric keypad. Further, input/output unit 214 may send output to, for example, a printer. Display 216 provides a mechanism to display information to a user of data processing system 200, such as via a screen visible to the user, a speaker audible to the user, or a transmitter capable of transmitting visual data and/or audio data to an external system that is visible or audible to the user, or a combination of these mechanisms.

Instructions for the operating system and applications or programs are located on persistent storage 208. These instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different illustrative embodiments may be embodied on different physical or tangible computer readable media, such as memory 206 or persistent storage 208.

Program code 218 is located in a functional form on computer readable media 220 and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive or a flash memory that is connected to data processing system 200. The tangible form of computer readable media 220 is also referred to as computer recordable storage media.

Alternatively, program code 218 may be transferred to data processing system 200 from computer readable media 220 through a communications link to communications unit 212 and/or through a connection to input/output unit 214. The communications link and/or the connection may be physical or wireless in the illustrative examples.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for determining a percentage probability that a selected point of interest is accessible to customers for commercial transactions (i.e., open for business) at a given time of day in response to a query from a portable navigation device. Illustrative embodiments enable users of two-way portable navigation devices, such as GPS transceiver units, to decide on the desirability of a point of interest as a destination based on current conditions and/or the conditions at the estimated time of arrival. Specifically, GPS navigation units can present additional information gathered about the point of interest to the user by querying a service provider for the probability that a given point of interest is open for business at a given point in time.

A utility company may ascertain the current power usage of a particular point of interest. While it is common for utility companies to use meters that require an individual to periodically visit the location to ascertain past power usage, utility companies are now actively replacing those types of meters with meters that are able to transmit real time power usage back to the utility companies. Moreover, while some power companies may not be able to ascertain the power usage of a specific point of interest, the utility companies can in real time ascertain the power usage of a substation servicing the point of interest. Typically, businesses in a given area operate during similar business hours. Based on real time utility usage data transmitted to the utility companies, the utility companies can calculate the probability that a particular point of interest at a given address is open for business in real time. Alternatively, the utility companies can calculate the probability that a particular point of interest is open through the use of historical utility usage data. The utility companies may provide this type of utility usage information as a service to point of interest information service providers or to third party aggregators. In addition, utility companies can build profiles for the locations they service and broker these profiles with adjacent utility companies to create a full fledged service.

Thus, illustrative embodiments provide an advantage over current point of interest systems because illustrative embodiments account for a variability of interest in a point of interest over time. Furthermore, data required to calculate this variability of interest is easily gathered by components of illustrative embodiments. Additionally, illustrative embodiments may also provide a non-traditional revenue stream for utility companies by the utility companies charging service providers for access to utility usage data for points of interest.

Figure 3:
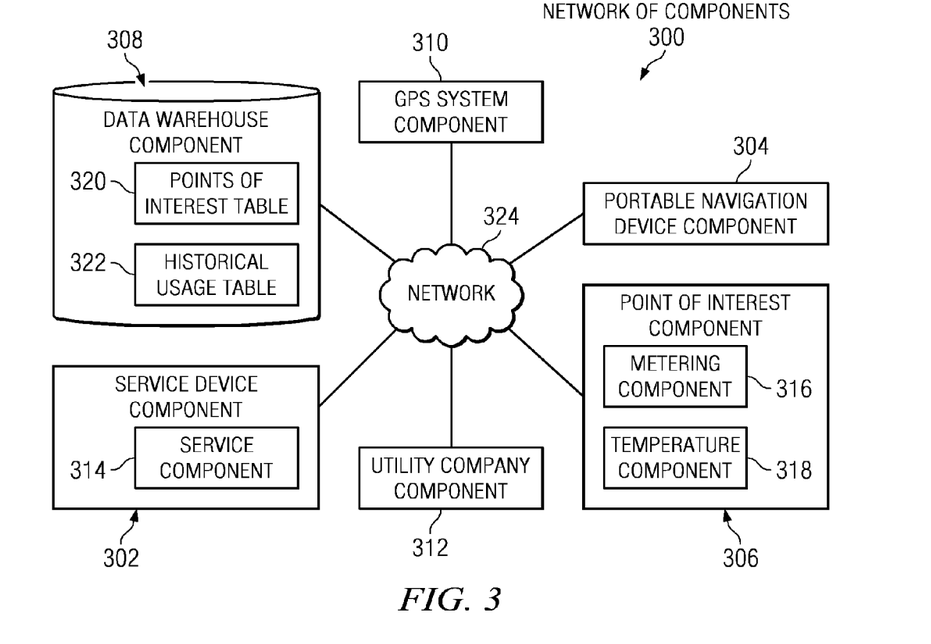
FIG. 3 is an exemplary block diagram of components used for determining a probability of whether points of interest are open at a given time of day in accordance with an illustrative embodiment.

With reference now to FIG. 3, an exemplary block diagram of components used for determining a probability of whether points of interest are open at a given time of day is depicted in accordance with an illustrative embodiment. Network of components 300 may be implemented in a network of data processing systems, such as network data processing system 100 in FIG. 1. Illustrative embodiments use network of components 300 to determine a probability that a selected point of interest is open based on utility usage data.

Network of components 300 includes server device component 302, portable navigation device component 304, point of interest component 306, data warehouse component 308, GPS system component 310, and utility company component 312. Server device component 302, portable navigation device component 304, point of interest component 306, data warehouse component 308, GPS system component 310, and utility company component 312 connect to network 324. Network 324 may, for example, be network 102 in FIG. 1. Server device component 302 is a computer, which a service provider uses to provide point of interest informational services to portable navigation device component 304 via network 324. Server device component 302 may, for example, be server 104 in FIG. 1.

Service component 314 resides on server device component 302. Service component 314 is a software application that monitors and controls processes of illustrative embodiments. Service component 314 uses data warehouse component 308 as a data source from which to calculate probabilities that a particular point of interest is open for business at a given time. Service component 314 may, for example, be a web service or other type of service that may be accessed via a public or private network. Service component 314 transmits responses to portable navigation device component 304 after receiving requests for information from portable navigation device component 304.

Portable navigation device 304 may, for example, be portable navigation device 110 in FIG. 1. Portable navigation device 304 is a wireless mobile device that is capable of interacting with users and is the consumer of data provided by service component 314. Portable navigation device 304 automatically indicates, or may permit a user to manually request, a probability that a selected point of interest is open at an estimated time of arrival. In addition, portable navigation device 304 may warn the user that the selected point of interest is likely to be closed upon arrival. Portable navigation device 304 communicates this information visually and/or audibly to the user via a display device, such as display 216 in FIG. 2.

Point of interest component 306 represents a point of interest, such as a restaurant. Point of interest component 306 includes metering component 316 and temperature component 318. However, it should be noted that even though metering component 316 and temperature component 318 are located at point of interest component 306 in this illustrative example, metering component 316 and temperature component 318 may be located near point of interest 306. Metering component 316 represents one or more utility metering devices that provide utility usage data. Utility usage data are data related to the amount of usage of one or more utilities, such as electric, gas, water, and telephone, by point of interest component 306. Metering component 316 may transmit the current utility usage data to utility company component 312, which in turn transmits this data to service component 314. Alternatively, metering component 316 may transmit the current utility usage data directly to service component 314. Subsequent to receiving the current utility usage data, service component 314 stores this data in data warehouse component 308.

Temperature component 318 represents a temperature measuring device that provides temperature data at point of interest component 306. However, it should be noted that temperature component 318 may be provided by a separate third party service, such as a national, state, or local weather service, and not by point of interest component 306. Further, point of interest component 306 may also include other components not shown to provide necessary data for processes of illustrative embodiments.

Data warehouse component 308 may, for example, be storage 108 in FIG. 1. Data warehouse component 308 is a non-volatile storage system in which relational queries may be executed against stored data. Data warehouse component 308 stores current utility usage data, as well as historical utility usage pattern data, which are provided by utility metering devices located at or near the points of interest. In addition, data warehouse 308 may also store other types of data, which service component 314 uses to calculate the probability that a particular point of interest is open at a given point in time. The other types of data may, for example, include confidence levels for stored utility usage data, names of the points of interest, specific locations for the points of interest, unique identifiers for the utility metering devices located at or near the points of interest, temperature data for the points of interest, and hours of operation at the points of interest. Data warehouse component 308 may store this data within one or more tables, such as points of interest table 320 and historical usage table 322.

GPS system component 310 may, for example, be GPS system 116 in FIG. 1. GPS system component 310 provides GPS data to portable navigation device component 304. Utility company component 312 represents one or more utility companies, such as, for example, electric, gas, water, and telephone companies, which provide utility service to point of interest component 306. Utility company component 312 monitors and controls metering component 316.

Service component 314 ascertains whether a particular point of interest is open for business at a specified time in response to receiving a query from portable navigation device component 304. In response to receiving the query, service component 314 retrieves current utility usage and temperature data for the particular point of interest from data warehouse component 308. In addition, service component 314 retrieves historical utility usage data for the particular point of interest for days in which the recorded temperature was within a threshold of degrees, such as, for example, five degrees, of the current temperature and the time was within a threshold of hours, such as, for example, three hours, of the estimated time of arrival. The thresholds of degrees and hours may vary by point of interest to account for regional differences. For example, a region with a relatively consistent temperature throughout the day may allow for a relatively lower threshold of degrees and/or a relatively higher threshold of hours than other regions.

Then, service component 314 measures a percentage utility usage change from one utility usage measurement to the next for the days in which the recorded temperature was within the threshold degrees of the current temperature. Then, service component 314 selects the two utility usage measurements in which the percentage change decreased the most and the percentage change increased the most for the days in which the recorded temperature was within the threshold degrees of the current temperature. Then, service component 314 selects the two utility usage measurements in which the percentage change decreased the most and the percentage change increased the most for the day of the week that is the same as the current day of the week. If the current utility usage at the particular point of interest is between the largest percentage decrease and the largest percentage increase, then service component 314 determines that the particular point of interest is most likely closed. If the estimated time of arrival at the particular point of interest is between the largest percentage increase and the largest percentage decrease, then service component 314 determines that the particular point of interest is most likely open.

Figure 4:
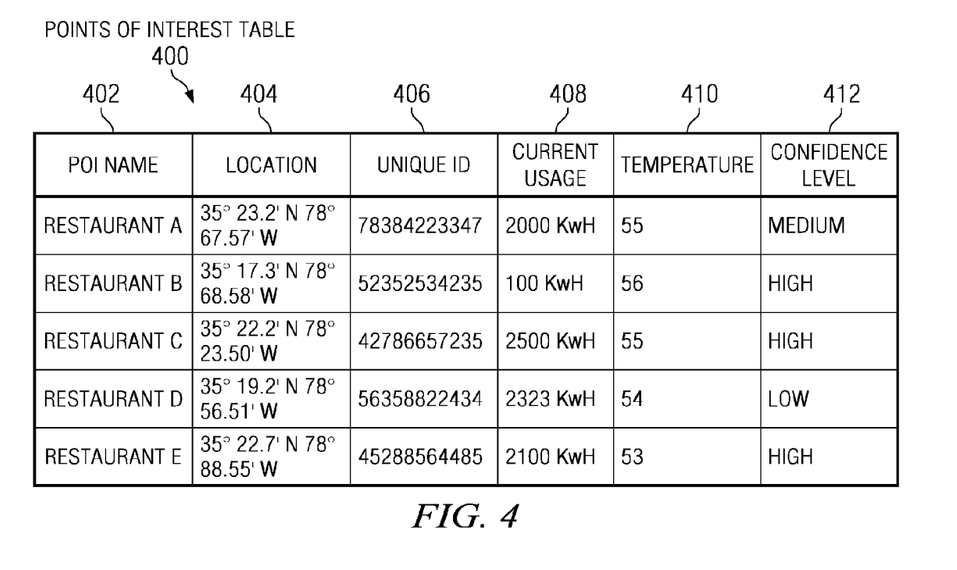
FIG. 4 is an exemplary illustration of a points of interest table in accordance with an illustrative embodiment.

With reference now to FIG. 4, an exemplary illustration of a points of interest table is depicted in accordance with an illustrative embodiment. Points of interest table 400 may, for example, be points of interest table 320 in FIG. 3. Points of interest table 400 records data associated with a plurality of points of interest. Points of interest table 400 includes point of interest name 402, location 404, unique ID 406, current usage 408, temperature 410, and confidence level 412. However, it should be noted that points of interest table 400 is only intended as an exemplary illustration and may include more or less information as required by processes of illustrative embodiments.

Point of interest name 402 lists names of points of interest. Location 404 lists a specific location for each of the respective points of interest. In this illustrative example, location 404 includes GPS coordinates. However, illustrative embodiments may use other types of location data, such as, for example, street addresses.

Unique ID 406 lists a unique identifier for a utility metering device, such as metering component 316 in FIG. 3, which is located at or near each of the respective points of interest. Current usage 408 lists the current utility usage of each of the respective points of interest. Temperature 410 lists the current outside temperature at each of the respective points of interest. Confidence level 412 lists a value, such as high, medium, or low, for the level or degree of confidence in the current utility usage measurement for each of the respective points of interest. In other words, confidence level 412 is used to weight the utility usage data. Confidence level 412 is assigned by a service component, such as service component 314 in FIG. 3.

Figure 5:
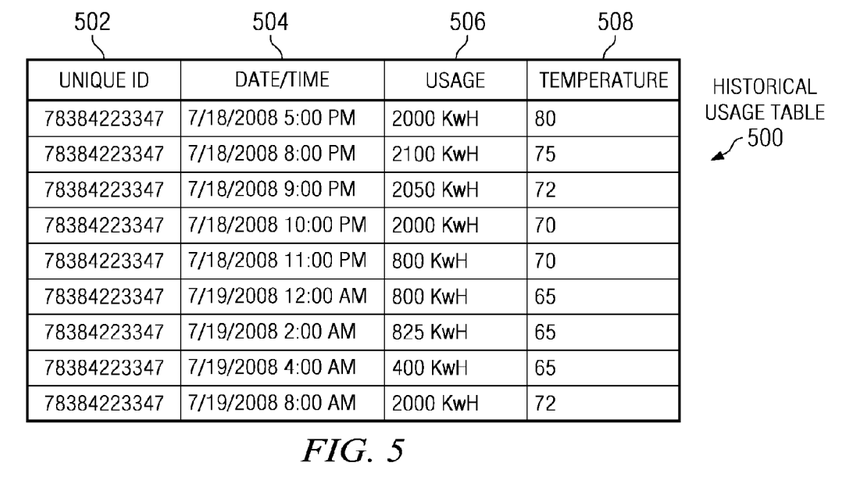
FIG. 5 is an exemplary illustration of a historical usage table in accordance with an illustrative embodiment.

With reference now to FIG. 5, an exemplary illustration of a historical usage table is depicted in accordance with an illustrative embodiment. Historical usage table 500 may, for example, be historical usage table 322 in FIG. 3. Historical usage table 500 records historical utility usage data and other related information for a plurality of points of interest. Historical usage table 500 includes unique ID 502, Date/Time 504, Usage 506, and temperature 508. However, it should be noted that historical usage table 500 is only intended as an exemplary illustration and may include more or less information as required by processes of illustrative embodiments.

Unique ID 502 may, for example, be unique ID 406 in FIG. 4. In this exemplary illustration, unique ID 502 lists the unique identifier for one utility metering device located at or near a point of interest (i.e., the unique identifier for the metering device located at or near Restaurant A in the example of FIG. 4). Date/Time 504 lists the date and time each utility usage measurement was made by the metering device identified by unique ID 502. Usage 506 lists the utility usage measurement made by the metering device at each of the respective dates and times. Temperature 508 lists the outside temperature at the point of interest when each of the respective utility usage measurements was made.

Figure 6:
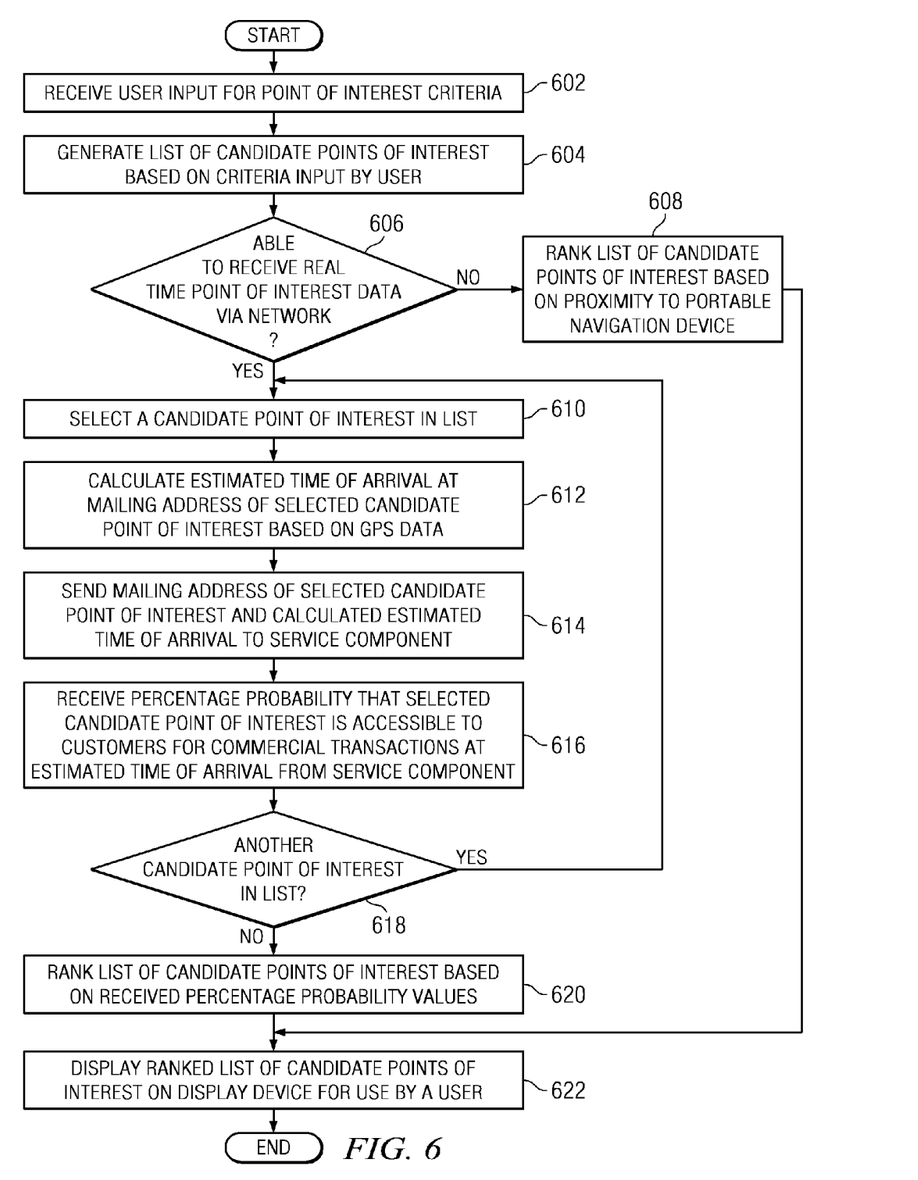
FIG. 6 is a flowchart illustrating an exemplary process for displaying a ranked list of candidate points of interest on a portable navigation device in accordance with an illustrative embodiment.

With reference now to FIG. 6, a flowchart illustrating an exemplary process for displaying a ranked list of candidate points of interest on a portable navigation device is shown in accordance with an illustrative embodiment. The process shown in FIG. 6 may be implemented in a portable navigation device, such as portable navigation device 110 in FIG. 1.

The process begins when the portable navigation device receives user input for point of interest criteria (step 602). The criteria may, for example, be all points of interest associated with a specified destination or only restaurants located at the specified destination. After receiving the user input in step 602, the portable navigation device generates a list of candidate points of interest based on the criteria input by the user (step 604). The list of candidate points of interest may be generated from data previously loaded or downloaded into the portable navigation device or may be generated from data acquired from a points of interest database or data warehouse, such as data warehouse component 308 in FIG. 3, via a network, such as network 324 in FIG. 3.

Then, the portable navigation device makes a determination as to whether the portable navigation device is able to receive real time point of interest data via the network (step 606). If the portable navigation device is not able to receive real time point of interest data via the network, no output of step 606, then the portable navigation device ranks the list of candidate points of interest based on proximity to the portable navigation device (step 608). Thereafter, the process proceeds to step 622. If the portable navigation device is able to receive real time point of interest data via the network, yes output of step 606, then the portable navigation device selects a candidate point of interest in the list (step 610).

Subsequent to selecting a point of interest in the candidate list in step 610, the portable navigation device calculates an estimated time of arrival at the mailing address or geographic position of the selected candidate point of interest based on GPS data provided by a GPS system, such as GPS system component 310 in FIG. 3 (step 612). Then, the portable navigation device sends the mailing address of the selected candidate point of interest and the calculated estimated time of arrival to a service component, such as service component 314 in FIG. 3 (step 614). Afterward, the portable navigation device receives a percentage probability that the selected candidate point of interest is accessible to customers for commercial transactions at the estimated time of arrival from the service component (step 616).

Then, the portable navigation device makes a determination as to whether another candidate point of interest is in the list (step 618). If another candidate point of interest is in the list, yes output of step 618, then the process returns to step 610. If another candidate point of interest is not in the list, no output of step 618, then the portable navigation device ranks the list of candidate points of interest based on the received percentage probability values (step 620). Subsequently, the portable navigation device visually and/or audibly displays the ranked list of candidate points of interest on a display device, such as display 216 in FIG. 2, for use by the user (step 622). The process terminates thereafter.

Figure 7:
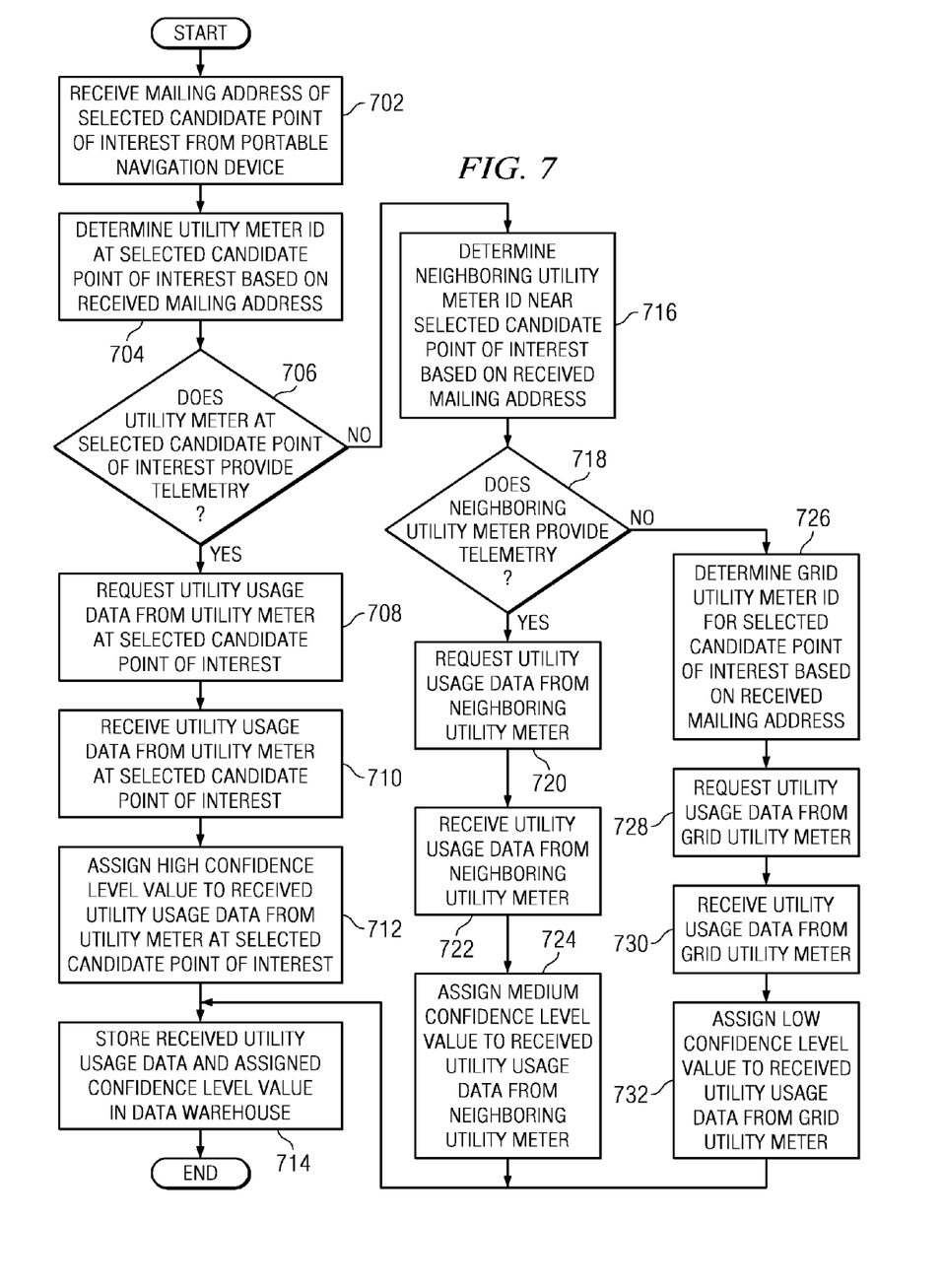
FIG. 7 is a flowchart illustrating an exemplary process for storing historical usage and confidence level data in a data warehouse in accordance with an illustrative embodiment.

With reference now to FIG. 7, a flowchart illustrating an exemplary process for storing historical usage and confidence level data in a data warehouse is shown in accordance with an illustrative embodiment. The process shown in FIG. 7 may be implemented in a service component, such as service component 314 in FIG. 3.

The process begins when the service component receives a mailing or street address of a selected candidate point of interest from a portable navigation device, such as portable navigation device component 304 in FIG. 3 (step 702). Then, the service component determines a utility meter identification (ID) for the selected candidate point of interest based on the received mailing address (step 704). Afterward, the service component makes a determination as to whether the utility meter, such as metering component 316 in FIG. 3, at the selected candidate point of interest provides telemetry of utility usage data (step 706). Telemetry, or telematics, is a technology that allows for remote measurement and reporting of information of interest.

If the utility meter at the selected candidate point of interest does provide telemetry, yes output of step 706, then the service component requests utility usage data from the utility meter at the selected candidate point of interest (step 708). Alternatively, the service component may request the utility usage data from the utility company, such as utility company component 312 in FIG. 3. Subsequently, the service component receives the utility usage data from the utility meter at the selected candidate point of interest (step 710). Then, the service component assigns a high confidence level value to the received utility usage data from the utility meter at the selected candidate point of interest (step 712). Afterward, the service component stores the received utility usage data and assigned confidence level value in a data warehouse, such as data warehouse 308 in FIG. 3 (step 714). Thereafter, the process terminates.

Returning again to step 706, if the utility meter at the selected candidate point of interest does not provide telemetry, no output of step 706, then the service component determines a neighboring utility meter ID for the selected candidate point of interest based on the received mailing address (step 716). Subsequently, the service component makes a determination as to whether the neighboring utility meter provides telemetry (step 718). If the neighboring utility meter does provide telemetry, yes output of step 718, then the service component requests utility usage data from the neighboring utility meter (step 720). Afterward, the service component receives the utility usage data from the neighboring utility meter (step 722). Then, the service component assigns a medium confidence level value to the received utility usage data from the neighboring utility meter (step 724). Thereafter, the process returns to step 714.

Returning again to step 718, if the neighboring utility meter does not provide telemetry, no output of step 718, then the service component determines a grid utility meter ID for the selected candidate point of interest based on the received mailing address (step 726). Subsequently, the service component requests utility usage data from the grid utility meter (step 728). Afterward, the service component receives the utility usage data from the grid utility meter (step 730). Then, the service component assigns a low confidence level value to the received utility usage data from the grid utility meter (step 732). Thereafter, the process returns to step 714.

Figure 8:
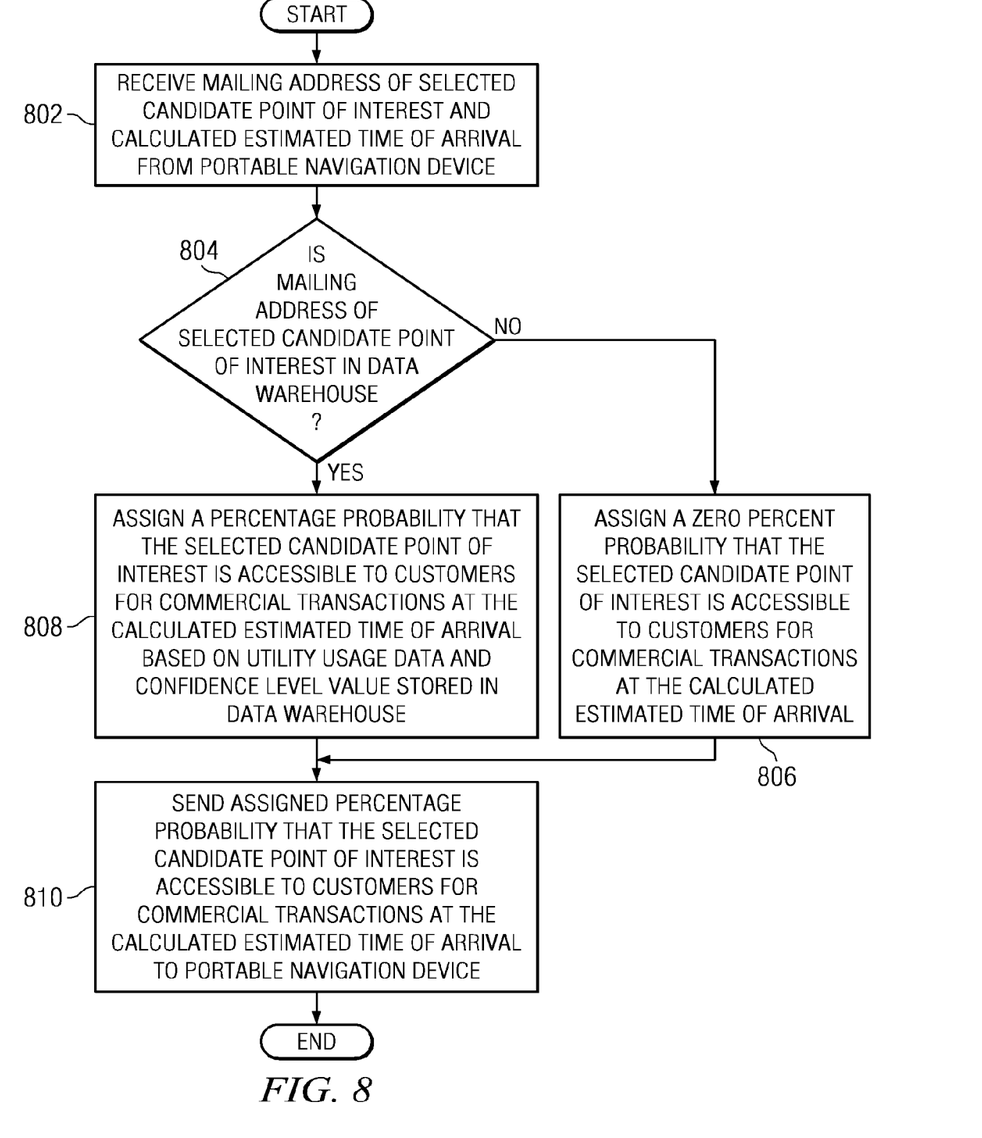
FIG. 8 is a flowchart illustrating an exemplary process for sending a percentage probability that a point of interest is open to a portable navigation device in accordance with an illustrative embodiment.

With reference now to FIG. 8, a flowchart illustrating an exemplary process for sending a percentage probability that a point of interest is open to a portable navigation device is shown in accordance with an illustrative embodiment. The process shown in FIG. 8 may be implemented in a service component, such as service component 314 in FIG. 3.

The process begins when the service component receives a mailing address of a selected candidate point of interest and a calculated estimated time of arrival from a portable navigation device, such as portable navigation device component 304 in FIG. 3 (step 802). After receiving the mailing address for the selected candidate point of interest, the service component makes a determination as to whether the mailing address is stored in a data warehouse, such as data warehouse component 308 in FIG. 3 (step 804). If the mailing address is not stored in the data warehouse, no output of step 804, then the service component assigns a zero percent probability that the selected candidate point of interest is accessible to customers for commercial transactions at the calculated estimated time of arrival (step 806). If the mailing address is stored in the data warehouse, yes output of step 804, then the service component assigns a percentage probability that the selected candidate point of interest is accessible to customers for commercial transactions at the calculated estimated time of arrival based on utility usage data, such as current usage 408 in FIG. 4 and usage 506 in FIG. 5, and a confidence level value, such as confidence level 412 in FIG. 4, which are stored in the data warehouse (step 808). The confidence level value weights the utility usage data. Then, the service component sends the assigned percentage probability that the selected candidate point of interest is accessible to customers for commercial transactions at the calculated estimated time of arrival to the portable navigation device (step 810). The process terminates thereafter.

Thus, illustrative embodiments of the present invention provide a computer implemented method, apparatus, and computer program product for determining a probability that a selected point of interest is open for business at a given time of day (i.e., the estimated time of arrival) in response to a query from a portable navigation device. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer-readable data storage medium can be any tangible apparatus that can store the program for use by or in connection with the instruction execution system, apparatus, or device.

The computer-readable data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a navigation system for determining a probability that a point of interest is accessible to customers for commercial transactions at an estimated time of arrival, the method comprising the steps of:

responsive to receiving a mailing address of a selected candidate point of interest and a calculated estimated time of arrival at the selected candidate point of interest from a portable navigation device via a network, determining by a server device an identification of a utility metering device at the selected candidate point of interest based on the received mailing address;

determining by the server device whether the utility metering device at the selected candidate point of interest provides utility usage data telemetry;

responsive to determining that the utility metering device at the selected candidate point of interest does not provide utility usage data telemetry, determining by the server device an identification of a neighboring utility metering device near the selected candidate point of interest based on the received mailing address;

determining by the server device whether the neighboring utility metering device near the selected candidate point of interest provides utility usage data telemetry;

responsive to determining that the neighboring utility metering device near the selected candidate point of interest does provide utility usage data telemetry, requesting by the server device utility usage data from the neighboring utility metering device near the selected candidate point of interest via the network;

receiving by the server device the utility usage data from the neighboring utility metering device near the selected candidate point of interest via the network;

assigning by the server device a confidence level value to the utility usage data received from the neighboring utility metering device near the selected candidate point of interest; and storing by the server device the utility usage data received from the neighboring utility metering device in a data storage device.

2. The method of claim 1, further comprising the steps of:

determining by the server device whether the mailing address of the selected candidate point of interest is stored in the data storage device;

responsive to determining that the mailing address of the selected candidate point of interest is stored in the data storage device, assigning by the server device a percentage probability that the selected candidate point of interest is accessible to customers for commercial transactions at the calculated estimated time of arrival based on the utility usage data received from the neighboring utility metering device and the confidence level value assigned to the utility usage data received from the neighboring utility metering device, wherein the confidence level value weights the utility usage data; and sending by the server device the percentage probability that the selected candidate point of interest is accessible to customers for commercial transactions at the calculated estimated time of arrival to the portable navigation device via the network.

3. The method of claim 2, further comprising the step of:

responsive to determining that the mailing address of the selected candidate point of interest is not stored in the data storage device, assigning by the server device a zero percent probability that the selected candidate point of interest is accessible to customers for commercial transactions at the calculated estimated time of arrival.

4. The method of claim 1, wherein the portable navigation device is one of a global positioning system unit, a personal digital assistant, or a cellular telephone.

5. The method of claim 1, wherein the utility usage data received from the neighboring utility metering device indicates an amount of usage of one or more utilities by a particular point of interest, and wherein the one or more utilities are at least one of an electric utility and a gas utility.

6. The method of claim 1, wherein the data storage device stores temperature data for the selected candidate point of interest, and wherein the temperature data is obtained from a temperature measuring device at the selected candidate point of interest via the network.

7. A computer system for determining a probability that a point of interest is accessible to customers for commercial transactions at an estimated time of arrival, the computer system comprising:

one or more processors, one or more computer-readable memories, and one or more computer-readable tangible storage devices;

program instructions, stored on at least one of the one or more computer-readable tangible storage devices for execution by at least one of the one or more processors via at least one of the one or more computer-readable memories, to determine an identification of a utility metering device at a selected candidate point of interest based on a received mailing address in response to receiving the mailing address of the selected candidate point of interest and a calculated estimated time of arrival at the selected candidate point of interest from a portable navigation device via a network;

program instructions, stored on at least one of the one or more computer-readable tangible storage devices for execution by at least one of the one or more processors via at least one of the one or more computer-readable memories, to determine whether the utility metering device at the selected candidate point of interest provides utility usage data telemetry;

program instructions, stored on at least one of the one or more computer-readable tangible storage devices for execution by at least one of the one or more processors via at least one of the one or more computer-readable memories, to determine an identification of a neighboring utility metering device near the selected candidate point of interest based on the received mailing address in response to determining that the utility metering device at the selected candidate point of interest does not provide utility usage data telemetry;

program instructions, stored on at least one of the one or more computer-readable tangible storage devices for execution by at least one of the one or more processors via at least one of the one or more computer-readable memories, to determine whether the neighboring utility metering device near the selected candidate point of interest provides utility usage data telemetry;

program instructions, stored on at least one of the one or more computer-readable tangible storage devices for execution by at least one of the one or more processors via at least one of the one or more computer-readable memories, to request the utility usage data from the neighboring utility metering device near the selected candidate point of interest via the network in response to determining that the neighboring utility metering device near the selected candidate point of interest does provide utility usage data telemetry;

program instructions, stored on at least one of the one or more computer-readable tangible storage devices for execution by at least one of the one or more processors via at least one of the one or more computer-readable memories, to receive the utility usage data from the neighboring utility metering device near the selected candidate point of interest via the network;

program instructions, stored on at least one of the one or more computer-readable tangible storage devices for execution by at least one of the one or more processors via at least one of the one or more computer-readable memories, to assign a confidence level value to the utility usage data received from the neighboring utility metering device near the selected candidate point of interest; and program instructions, stored on at least one of the one or more computer-readable tangible storage devices for execution by at least one of the one or more processors via at least one of the one or more computer-readable memories, to store the utility usage data received from the neighboring utility metering device in a data storage device.

8. The computer system of claim 7, further comprising:

program instructions, stored on at least one of the one or more computer-readable tangible storage devices for execution by at least one of the one or more processors via at least one of the one or more computer-readable memories, to determine whether the mailing address of the selected candidate point of interest is stored in the data storage device;

program instructions, stored on at least one of the one or more computer-readable tangible storage devices for execution by at least one of the one or more processors via at least one of the one or more computer-readable memories, to assign a percentage probability that the selected candidate point of interest is accessible to customers for commercial transactions at the calculated estimated time of arrival based on the utility usage data received from the neighboring utility metering device and the confidence level value assigned to the utility usage data received from the neighboring utility metering device in response to determining that the mailing address of the selected candidate point of interest is stored in the data storage device, wherein the confidence level value weights the utility usage data; and program instructions, stored on at least one of the one or more computer-readable tangible storage devices for execution by at least one of the one or more processors via at least one of the one or more computer-readable memories, to send the percentage probability that the selected candidate point of interest is accessible to customers for commercial transactions at the calculated estimated time of arrival to the portable navigation device via the network.

9. The computer system of claim 8, further comprising:

program instructions, stored on at least one of the one or more computer-readable tangible storage devices for execution by at least one of the one or more processors via at least one of the one or more computer-readable memories, to assign a zero percent probability that the selected candidate point of interest is accessible to customers for commercial transactions at the calculated estimated time of arrival in response to determining that the mailing address of the selected candidate point of interest is not stored in the data storage device.

10. A computer program product for determining a probability that a selected point of interest is accessible to customers for commercial transactions at an estimated time of arrival, the computer program product comprising:

one or more computer-readable tangible storage devices;
program instructions, stored on at least one of the one or more computer-readable tangible storage devices, to determine an identification of a utility metering device at a selected candidate point of interest based on a received mailing address in response to receiving the mailing address of the selected candidate point of interest and a calculated estimated time of arrival at the selected candidate point of interest from a portable navigation device via a network;
program instructions, stored on at least one of the one or more computer-readable tangible storage devices, to determine whether the utility metering device at the selected candidate point of interest provides utility usage data telemetry;
program instructions, stored on at least one of the one or more computer-readable tangible storage devices, to determine an identification of a neighboring utility metering device near the selected candidate point of interest based on the received mailing address in response to determining that the utility metering device at the selected candidate point of interest does not provide utility usage data telemetry;
program instructions, stored on at least one of the one or more computer-readable tangible storage devices, to determine whether the neighboring utility metering device near the selected candidate point of interest provides utility usage data telemetry;
program instructions, stored on at least one of the one or more computer-readable tangible storage devices, to request the utility usage data from the neighboring utility metering device near the selected candidate point of interest via the network in response to determining that the neighboring utility metering device near the selected candidate point of interest does provide utility usage data telemetry;
program instructions, stored on at least one of the one or more computer-readable tangible storage devices, to receive the utility usage data from the neighboring utility metering device near the selected candidate point of interest via the network;
program instructions, stored on at least one of the one or more computer-readable tangible storage devices, to assign a confidence level value to the utility usage data received from the neighboring utility metering device near the selected candidate point of interest; and
program instructions, stored on at least one of the one or more computer-readable tangible storage devices, to store the utility usage data received from the neighboring utility metering device in a data storage device.

11. The computer program product of claim 10, further comprising:
program instructions, stored on at least one of the one or more computer-readable tangible storage devices, to determine whether the mailing address of the selected candidate point of interest is stored in the data storage device;
program instructions, stored on at least one of the one or more computer-readable tangible storage devices, to assign a percentage probability that the selected candidate point of interest is accessible to customers for commercial transactions at the calculated estimated time of arrival based on the utility usage data received from the neighboring utility metering device and the confidence level value assigned to the utility usage data received from the neighboring utility metering device, wherein the confidence level value weights the utility usage data; and
program instructions, stored on at least one of the one or more computer-readable tangible storage devices, to send the percentage probability that the selected candidate point of interest is accessible to customers for commercial transactions at the calculated estimated time of arrival to the portable navigation device via the network.

12. The computer program product of claim 11, further comprising:
program instructions, stored on at least one of the one or more computer-readable tangible storage devices, to assign a zero percent probability that the selected candidate point of interest is accessible to customers for commercial transactions at the calculated estimated time of arrival in response to determining that the mailing address of the selected candidate point of interest is not stored in the data storage device.

13. The computer program product of claim 10, wherein the portable navigation device is one of a global positioning system unit, a personal digital assistant, or a cellular telephone.

14. The computer program product of claim 10, wherein the utility usage data received from the neighboring utility metering device indicates an amount of usage of one or more utilities by a particular point of interest, and wherein the one or more utilities are at least one of an electric utility and a gas utility.

15. The computer program product of claim 10, wherein the data storage device stores temperature data for the selected candidate point of interest, and wherein the temperature data is obtained from a temperature measuring device at the selected candidate point of interest via the network.

* * * * *